United States Patent [19]
Siddall et al.

[11] 3,872,101
[45] Mar. 18, 1975

[54] SYNTHESIS OF α, β-UNSATURATED COMPOUNDS

[75] Inventors: John E. Siddall; John H. Fried, both of Palo Alto, Calif.

[73] Assignee: Zoecon Corporation, Palo Alto, Calif.

[22] Filed: Jan. 19, 1973

[21] Appl. No.: 325,770

Related U.S. Application Data

[63] Continuation of Ser. No. 815,482, April 11, 1969, abandoned, which is a continuation-in-part of Ser. No. 796,201, Feb. 3, 1969, abandoned.

[52] U.S. Cl. 260/326.5 E, 260/484 R, 260/290 HL, 260/486 R, 260/590, 260/290 V, 260/592, 260/593 R, 260/340.9, 260/598, 260/599, 260/340.7, 260/601 R, 260/346.1 R, 260/347.4, 260/347.7, 260/347.8, 260/348 A, 260/404, 260/405, 260/408, 260/410, 260/410.5, 260/464, 260/410.9 R, 260/404.5, 260/465 D, 260/465 E, 260/465 F, 260/465 G, 260/465 K, 260/465.5, 260/465.6, 260/465.4, 260/465.7, 260/465.9, 260/468 R, 260/469, 260/471 R, 260/482 R, 260/476 R

[51] Int. Cl... C07d 27/02, C07c 67/00, C07c 45/00

[58] Field of Search..... 260/410.9 R, 486 R, 561 N, 260/465.9, 593 R, 601 R

[56] References Cited
OTHER PUBLICATIONS

Bretting et al., Acta Chem. Scand. 14 151–156 (1960).
Iwai et al. Chemical Abstracts 58 1392a (1963).
Decaux et al. Compt. Rend. Ser. C 267 738–741 (9/16/68).
Boularand et al., Bull. Soc. Chim. France No. 5, 1706–1711 (May, 1967).
House et al., J. Org. Chem. 31 3128–3141 (1966).
Munch-Peterson, Bull. Soc. Chim. France No. 2 pp. 743–750 Feb., 1966.

*Primary Examiner*—Donald G. Daus
*Assistant Examiner*—Diana G. Rivers
*Attorney, Agent, or Firm*—Lee-Louise H. Priest; Donald W. Erickson

[57] ABSTRACT

Stereospecific synthesis of α,β-ethylenically unsaturated compounds by the reaction of an organo-copper or organo-manganese reagent with an α,β-acetylenically unsaturated compound at a temperature of −40°C or less.

18 Claims, No Drawings

SYNTHESIS OF α, β-UNSATURATED COMPOUNDS

This is a continuation of application Ser. No. 815,482, filed Apr. 11, 1969, now abandoned, which is a continuation-in-part of application Ser. No. 796,201, filed Feb. 3, 1969, now abandoned.

This invention relates to the novel synthesis of α, β-ethylenically unsaturated compounds. More particularly, the present invention relates to the synthesis of α, β-ethylenically unsaturated compounds by the reaction of an organo-metallic reagent with a α,β-acetylenically unsaturated compound whereby the organo group of the organo-metallic reagent is added stereospecifically to the β-carbon atom of the acetylenic compound.

One method practiced theretofore for preparing tri-substituted α, β-ethylenically unsaturated compounds, for example, acids, acid esters or aldehydes, was to subject the α, β-acetylenically unsaturated acid or ester to reduction to form the allylic alcohol, introduce a halogen atom, such as iodo on the γ-carbon atom of the allylic alcohol, react the halogen-substituted allylic alcohol with an organo-copper reagent thereby displacing the halogen atom with the organo group of the organo-copper reagent and thereafter subjecting the substituted alcohol to oxidation to form the aldehyde and the ester. See Corey et al., J. Am. Soc. 89, 4245 (1967) and Corey et al., ibid. 90, 5618 (1968).

The process of the present invention provides significant advantages over prior art processes. Briefly stated, the process of the present invention provides an excellent method of general utility for the direct sterospecific addition of an organo radical to the β-carbon atom of an α,β-ethylenically unsaturated compound to afford the α, β-ethylenically unsaturated compound. In addition, the process of the present invention provides a stereospecific method for the preparation of substituted α, β-ethylenically unsaturated compounds whereby substituents sensitive to reduction, halogenation or oxidation are not affected. Other advantages and meritorious features of the present invention will become apparent as the invention is described in greater detail hereinafter.

The expression "α, β-acetylenically unsaturated compound," as used herein, refers to a compound having the acetylene group (-C ≡ C-) in which the acetylene group is substituted on the α-carbon atom with an electron withdrawing group, that is, cyano, formyl, amido (including substituted amido), alkoxycarbonyl, aryloxycarbonyl, aralkoxycarbonyl, alkylcarbonyl, aralkylcarbonyl and arylcarbonyl and on the β-carbon atom with hydrogen or an organo radical, e.g. a hydrocarbon radical, saturated or unsaturated, such as alkyl, alkenyl, alkynyl, cycloalkyl, aryl or aralkyl which can be substituted by one or more groups inert to the reaction, such as chloro, fluoro, bromo, iodo, carbonyl, acyloxy, alkoxy, cycloalkoxy, cycloalkyl, alkylidenedioxy, dialkylamino, furyl, pyridyl, and the like. The presence of a carbonyl group immediately adjacent to the β-carbon atom of the α, β-acetylenically unsaturated compound may cause undesired side reactions. The presence of groups, such as amino, hydroxyl, and the like, on the organo radical generally require the use of an excess of organo-metallic reagent because they usually compete with the reaction and are not totally inert. Although in the context of the present invention an upper limit need not be fixed on the number of carbon atoms in the organo group of the α, β-acetylenically unsaturated compound, in practice such groups generally contain up to 30 carbon atoms and more often up to 20 carbon atoms. For most purposes, the organo group contains up to 12 carbon atoms.

The expression "α, β-ethylenically unsaturated compound," as used herein, refers to an α, β-ethylenically unsaturated compound which is substituted on the α- and β-carbon atoms the same as the acetylenic starting material and the β-carbon atom is additionally substituted with the organo radical derived from the organo-metallic reagent, that is, a hydrocarbon radical, saturated or unsaturated, such as alkyl, alkenyl, alkynyl, cycloalkyl, aryl and aralkyl which can be substituted by one or more groups inert to the reaction required to form the organo-metallic reagent which may include alkoxy, cycloalkoxy, alkylidenedioxy, cycloalkyl, alkyl, dialkylamino, pyridyl, furyl, and the like. In order to minimize undesired side reactions, any unsaturation in the alkenyl or alkynyl group of the organo-metallic reagent should be spaced from the metal by at least two tetrahedral carbons. Although in the context of the present invention an upper limit need not be fixed on the number of carbon atoms in the organo group(s) of the organo-metallic reagent, in practice such groups generally contain up to 30 carbon atoms and more often up to 20 carbon atoms. For most purposes, such groups contain up to 12 carbon atoms.

The term "copper," as used herein, refers to the copper (I) form, i.e. cuprous.

The term "manganese," as used herein, refers to the managanese (II) form, i.e. manganous.

The term "iron," as used herein, refers to the iron (II) form, i.e. ferrous.

The term "cobalt," as used herein, refers to the cobalt (II) form, i.e. cobaltous.

The term "chromium," as used herein, refers to the chromium (III) form, i.e., chromic.

The term "chromous", as used herein, refers to the chromium (II) form.

The terms "metal," as used herein, refers to the chromium (II) form.

The terms "metal" and "metallic," as used herein, refer to copper (I), manganese (II), iron (II), cobalt (II), chromium (II) and chromium (III).

The term "organo-metallic reagent," as used herein, includes organo-metallic reagents of the following empirical formulas:

(I)

(II)

(III)

in which M is copper, manganese, iron, cobalt, chromium or chromous; M' is manganese, iron, cobalt, chromium or chromous; $n$ is the oxidation state of the metal; Li is lithium; X is iodo, bromo or chloro; L is a solubilizing ligand; and R is an organo radical as defined hereinabove in connection with the definition of "α, β-ethylenically unsaturated compound."

In the practice of the process of the present invention, an α, β-acetylenically unsaturated compound is allowed to react with at least onemolar equivalent of an organo-metallic reagent in an anhydrous organic solvent which is inert to the reaction. The organo radical of the organo-metallic reagent adds stereospecifically to the β-carbon of the acetylenic compound to yield the α, β-ethylenically unsaturated compound.

The organo-metallic reagents useful in the production of α, β-ethylenically unsaturated compounds in accordance with the process of the present invention can be prepared by any one of several methods. For example, the organo-metallic reagents of formula II can be prepared by the reaction of a metal salt, that is, a metal halide (iodide, bromide or chloride), metal acetate or metal cyanide, such as cuprous iodide, manganous iodide, ferrous iodide, cobaltous iodide, cuprous bromide, cuprous chloride, chromic iodide, or chromous iodide, cuprous acetate, or cuprous cyanide with an organolithium, such as primary, secondary, or tertiary alkyl-lithium, e.g. methyl-lithium, n-butyl-lithium, isopropyl-lithium, t-butyl-lithium, and the like, or an aryllithium, e.g. phenyllithium, and the like. Organo-metallic reagents can also be prepared by the reaction of a metal salt with an organo-magnesium halide or the reaction of a metal salt with a diorgano-magnesium.

The desirability of a solubilizing ligand is evidenced, for example, by the organic solvent insolubility and consequent low reactivity of some organo-metals of the general formula $R_nM^n$, such as mono-methyl-copper, mono-t-butyl-copper and diethylmanganese which can be made to react advantageously with α, β-acetylenically unsaturated compounds in the presence of a solubilizing ligand, such as a tertiary phosphine, tertiary phosphite or an amine, preferably a secondary or tertiary amine.

Organo-metallic reagents having a solubilizing ligand can be prepared, for example, by the reaction of an organo-lithium with a metal salt in the presence of a tertiary phosphine, tertiary phosphite or amine; by the reaction of an organo-magnesium halide (iodide, bromide or chloride) with a metal salt in the presence of a tertiary phosphine, tertiary phosphite or amine; or by the reaction of a di-organo-magnesium with a metal salt in the presence of a tertiary phosphine, tertiary phosphite or amine. The organo-magnesium halide or Grignard can be prepared from an organo halide and magnesium. Procedures for preparing organo-metallic reagents and intermediates therefor for the practice of the process of the present invention are described in the literature in detail and in the examples hereinafter. See, for example, Gilman et al., Rec. Trav. Chim. 55, 821 (1936); Gilman et al., J. Org. Chem. 17, 1630 (1952); Riemschneider, Z. Natur Forsch 156, 547 (1960); Bacon et al., Quarterly Review (London) 19, 95 (1965); Annals of N.Y. Academy of Sciences 125, 4; 161 (1965); House et al., J. Org. Chem. 31, 3128 (1966); Corey et al., J. Am. Chem. Soc. 89, 3911 (1967); Rona et al., ibid. 90, 4733 (1968); Corey et al., ibid. 90, 5615 (1968); House et al., J. Org. Chem. 33, 949 (1968); and U.S. Pat. No. 2,944,070.

The preparation of the organo-metallic reagent is advantageously done using a tertiary phosphine, tertiary phosphite or amine as a solubilizing ligand in that more complete utilization of the organo groups of the organo-metallic reagent is obtained. The tertiary phosphine, tertiary phosphite or amine should be present in the amount of at least one molar equivalent based on the metal; however, an additional molar equivalent should be used when an organo-magnesium halide is used to prepare the organo-metallic reagent. The use of an amine is preferred in that it also improves the stereospecificity of the reaction between the organo-metallic reagent and the α, β-acetylenically unsaturated compound. The use of an amine is also preferred in that purification of the α, βethylenically unsaturated product is greatly simplified in that the amine ligand can be removed from the reaction product simply by washing with dilute inorganic or organic acid whereas in the case of phosphines, fractional distillation is required for removal of the phosphine from the reaction product and in the case of phosphites, exhaustive water washing is required for the work-up. Suitable amines include secondary amines and tertiary amines, such as dialkylamines, trialkylamines, cycloalkylamines, cyclicamines, and the like, e.g. pyrrolidine, pyridine, diethylamine, piperidine, triethylamine, 2,2-bipyridyl, N-methylcyclohexylamine, diproplylamine, trimethylamine, and the like. Suitable tertiary phosphines and tertiary phosphites include trialkylphosphines, trialkylphosphites and tricarbocyclic (including mono-aryl) phosphines and phosphites, such as trimethylphosphine, trimethylphosphite, tri-n-butylphosphine, triethylphosphine, tricyclohexylphosphine, triphenylphosphine, triphenylphosphite, tribenzylphosphite, triethylphosphite, and the like.

The preparation of the organo-metallic reagent generally should be carried out at low temperatures of the order of about room temperature to about −150°C, preferably from about −40°C to about −100C in organic solvents inert to the reaction, such as ethers, hydrocarbons, and the like, e.g. pentane, ether, (diethyl ether), tetrahydrofuran, monoglyme, toluene, diglyme, dioxane, and the like, and mixtures thereof, such as ether: pentane, ether:hexane, and the like.

In the practice of the process of the present invention, because of the general instability of the organo-metallic reagent to high tempeprature, it is preferable not to isolate the organo-metallic reagent but rather to maintain the reagent at low temperature and add the α, β-acetylenically unsaturated compound to the reagent medium, preferably with stirring and under an inert atmosphere, such as argon or nitrogen, using the same organic solvent as used in the preparation of the organo-metallic reagent or an inert organic solvent miscible therewith. In general, the reaction between the organo-metallic reagent and the α, β-acetylenically unsaturated compound is fast and goes to completion within seconds or minutes to a few hours. After alkylation of the acetylenic compound is complete, the reaction mixture is worked-up by quenching, e.g. injection, with water before the cooling means is removed for optimum stereoselectivity. For optimum results, itt is important that the reaction be conducted under anhydrous conditions and preferably under an inert oxygen-free atmosphere, such as under nitrogen, argon, and the like.

The foregoing reaction conditions are largely dependent upon the particular organo-metallic reagent and α, β-acetylenically unsaturated compound employed and are presented as a guide. Provided with the foregoing and the examples hereinafter, the most advantageous or optimum conditions and proportions of the organo-metallic reagent and α, β-acetylenically unsaturated compounds are easily determinable by one of ordinary skill in the art using routine experimentation.

The process of the present invention is applicable to the conversion of α, β-acetylenically unsaturated compounds into α,β-ethylenically unsaturated compounds in general. The α,β-acetylenically unsaturated compounds that can be employed in the process of the present invention are too numerous to list here. Exemplary of the α,β-acetylenic compounds that can be used in the process of the present invention are α,β-acetylenically unsaturated aliphatic acid esters, amides, ketones, nitriles and aldehydes represented by the general formula:

$$R^2—C \equiv C—R^1$$

(IV)

in which $R^1$ is cyano, formyl, alkoxycarbonyl, aryloxycarbonyl, aralkoxycarbonyl, alkylcarbonyl, arylcarbonyl, aralkylcarbonyl, amido including substituted amido, such as alkylamido, cycloalkylamido and dialkylamido and $R^2$ is hydrogen or an organo group as defined hereinabove in connection with the definition of α,β-acetylenically unsaturated compound. Typical compounds include tetrolic esters (2-butynoic ester), 2-pentynoic esters, 2-octynoic esters, 2-heptynoic esters, 2-hexynoic esters, phenylpropiolic esters and α-naphthylpropiolic esters, such as methyl 2-butynoate, ethyl 2-butynoate, ethyl 2-pentynoate, methyl hexynoate, propyl 2-butynoate, ethyl phenyl-propynoate, ethylethyl hexynoate; 1-cyano-1-heptyne, 1-cyano-1-octyne, cyclohexylpropiolonitrile, 1-cyano-1-butyne, 3-phenylpropionitrile, 1- cyano-1-pentyne; 2-butynamide, N,N-diethyl 2-butynamide, N-ethyl 2-butynamide, N,N-dimethyl 2-pentynamide, N,N-diethyl 2-pentynamide, N,N -di-(n-propyl) -2-butynamide, 2-octynamide, N,N-diethyl 2-hexynamide; 3-pentyn-2-one, 3-octyn - 2-one, 3-nonyn-2-one, 4-phenyl-3- butyn-2-one, phenyl phenylethynylketone; 5-phenyl 2-pentynoic esters (phenyl ethylpropiolic esters), ethyl 5-phenyl 2-pentynoate, 2-butynal, 2-heptynal, and the like.

α, β-acetylenically unsaturated compounds exemplified by those represented by formula IV above can be prepared by procedures described in the art. For example, αβ-acetylenic ketones can be made by the reaction of a sodium acetylide with an acid chloride or an ester, by the oxidation of the corresponding secondary α-hydroxyacetylenes or by the reaction of an anhydride and acetylenic Grignard. See, for example, Kroeger et al., J. Am. Chem. Soc. 58, 1861 (1936) and Braude et al., J. Chem. Soc., 612 (1949). Aldehydes can be obtained, e.g. by the formylation of a sodium acetylide or by the dehydrobromination of the corresponding dibrominated α,β-ethylenic aldehyde. See, for example, Lunt et al., *J. Chem. Soc.*, 3361 and 3364 (1950) and Raphael et al., ibid., 2693 (1951). Esters can be prepared from the corresponding α,β-acetylenic acid or acid chloride by treatment with an alcohol in the presence of a catalyst, by treatment with a diazoalkane, and the like. The α,β-acetylenic acid can be prepared by treatment of acetylenic alkali metal or Grignard derivative with carbon dioxide; by bromination-dehydrobromination of the corresponding α,β-ethylenic acid; by oxidation of primary hydroxy-acetylenes, and the like. See, for example, Raphael et al., *J. Chem. Soc.*, 115 and 120 (1950) and Johnson, A. W., "The Chemistry of the Acetylenic Compounds," Vol. II, London (1950). Nitriles can be prepared by the reaction of cyanogen chloride and the corresponding acetylenic Grignard or by the reaction of an acetylenic iodide with alkali cyanide or cuprous cyanide. See, for example, Newman et al., *J. Am. Chem. Soc.* 71, 1292 (1949) and Maureu et al, *Bull. Soc. Chim. France*, (3), 35, 542 (1903). Amides can be prepared, for example, by treatment of an acetylenic acid halide or acetylenic acid with ammonia or amines, hydrolysis of the corresponding nitrile or reaction of acetylenic Grignard with isocyanates. For the preparation of acetylenic compounds in general and reactions thereof, see R. A. Raphael, "Acetylenic Compounds in Organic Synthesis," Butterworth and Co., London (1955).

The α,β-ethylenically unsaturated compounds prepared by the process of the present invention are useful in the perfume, insecticide, insect attractant, pharmaceutical and polymer industries as intermediates and final products. See, for example, U.S. Pat. Nos. 2,824,896; 2,840,583; 2,849,466; 2,889,339; 2,900,342; 2,992,237; 3,023,178; 3,031,481; 3,154,570; 3,177,226; 3,235,570; 3,262,953; 3,382,276; Dahm et al., *J. Am. Chem. Soc.* 89, 5292 (1967) and Mori et al., *Tetrahedron Letters* 26, 2515 (1967).

The term "alkyl", as used herein, refers to saturated aliphatic hydrocarbons, branched and straight chain. The terms "alkenyl" and "alkynyl,"as used herein, refer to ethylenically unsaturated aliphatic hydrocarbons and acetylenically unsaturated aliphatic hydrocarbons, respectively, branched and straight chain. Although in the context of the present invention an upper limit need not be fixed on the number of carbon atoms in the aliphatic hydrocarbon chain, in practice such chains generally contain 30 or less carbon atoms and more often 1 to 20 carbon atoms. The terms "lower alkyl", "lower alkenyl" and "lower alkynyl" refer to alkyl, alkenyl and alkynyl, respectively, having a chain length of 1 to 12 carbon atoms. Typical alkyl groups are methyl, ethyl, propyl, isopropyl, butyl, t-butyl, pentyl, isopentyl, t-pentyl, hexyl, 3-methyl-1-pentyl, heptyl, s-heptyl, octyl, 2-ethylhexyl, nonyl, decyl, dodecyl, tetradecyl, hexadecyl, octyldecyl, eicosyl, and the like. Typical alkenyl and alkynyl groups are vinyl, propenyl, isopropenyl, but-2-enyl, isobutenyl, pent-2-enyl, pent-3-enyl, hex-2-enyl, 2-methylbut-2-enyl, 4-methylpent-3-enyl, 2-methylpent-3-enyl, 2-ethylbut-3-enyl, hept-2-enyl, hept-3-enyl, 3-methylhex-3enyl, 4,4-dimethylpent-3-enyl, oct-4-enyl, 2,2-dimethylhex-3-enyl, 4-methyloct-4-enyl, 4-methyldec-8-enyl, dodec-9-enyl, tridec-11-enyl, 2-methyl-3,5-hexadienyl, 4,6-octadienyl, 3,5,7-octatrientyl, 2,2-dimethyl-3,4-hexadienyl, hex-3-ynyl, pent-2-ynyl, oct-3-ynyl, oct-4-ynyl, but-2-ynyl, and the like.

The term "alkoxy" refers to the group —OAlkyl with alkyl as defined herein including lower alkyl.

The term "aryl," as used herein, refers to monaryl (phenyl) and diaryl (napthyl) groups which can be substituted with one or more groups, such as lower alkyl, lower alkoxy, and the like. Typical aryl groups are phenyl, naphthyl, tolyl, ethylphenyl, diethylphenyl, isopropylphenyl, t-butylphenyl, alkoxyphenyl, and the like. The term aryloxycarbonyl refers to the group

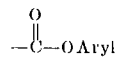

with aryl as defined herein.

The term "aralkyl", as used herein, refers to a monovalent group in which an aryl group is substituted for a hydrogen atom of an alkyl group. Typical aralkyl groups are benzyl, xylyl, mesityl, phenylethyl, phenylpropyl, methylbenzyl, caprylbenzyl, naphthylmethyl, naphthylethyl, and the like. The term "aralkoxycarbonyl" refers to the group

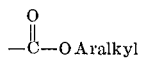

with aralkyl as defined herein.

Although in the context of the present invention an upper limit need not be fixed on the number of carbon atoms of the aryl or aralkyl group, such groups generally contain up to 30 carbon atoms and more often up to 20 carbon atoms. Most frequently such groups contain up to 12 carbon atoms.

The term "cycloalkyl," as used herein, refers to monovalent cyclic alkyl groups having three to about seven carbon atoms, such as cyclopropyl, cyclobutyl, cyclopentyl, cycloheptyl, and the like. The term "cycloalkoxy" refers to the group —OCycloalkyl with cycloalkyl as defined herein.

Although particular transition metals have been specified herein, other metals of the transition metal series can also be used in the practice of the present invention.

The following examples are provided to illustrate the present invention. Temperature is given in degrees Centigrade unless otherwise specified.

EXAMPLE 1

A. To a suspension of 950 mg. of cuprous iodide (5.0 mmoles) in 80 ml. dry ether is added at -20° in an argon atmosphere, 5.9 ml. of a 1.67 M ethereal methyl lithium solution (9.85 mmoles MeLi), to give an almost colorless solution of dimethyl copper lithium.

B. To a solution prepared in A above of approximately 5.0 mmoles of dimethyl copper lithium is added at -100° a solution of 505 mg. of methyl 2-pentynoate (4.50 mmoles) in 20 ml. of ether. After 2 minutes, 1 ml. of water is added. Then the reaction mixture is allowed to rise to room temperature and filtered. The filtrate is washed with saturated sodium potassium tartrate solution, sodium chloride (brine) solution and dried with sodium sulfate. The ether is evaporated leaving an oily concentrate which is distilled at 60 mm. and bath temperature up to 120° to give a colorless liquid containing cis + trans-methyl 3-ethylcrotonate (methyl 3-methylpent-2-enoate), cis-trans ratio 95.5:4.5. Pure cis isomer is isolated by fractional distillation. Methyl 3-ethylcrotonate can be converted into methyl 10,-11-oxido-3,11-dimethyl-7-ethyltrideca-2,6-dienoate by the procedure of Dahm et al., *J. Am. Chem. Soc.* 89, 5292 (1967) which is useful for the control of insects.

EXAMPLE 2 a solution of dimethyl copper lithium is prepared according to Part A, Example 1. To the solution is added at 0°, a solution of 505 mg. of methyl 2-pentynoate in 29 ml. of ether. After 2 minutes, the reaction mixture is quenched by addition of 1 ml. of water. The reaction mixture is allowed to rise to room temperature and then is worked up using the procedure of Part B, Example 1 to give a colorless liquid containing cis and trans methyl 3-ethylcrotonate (cis:trans ratio of 39.61).

EXAMPLE 3

A. To a mixture of 950 mg. of cuprous iodide (5.0 mmoles) and 362 mg. of pyrrolidine (5.1 mmoles) in 10 ml. of ether, cooled to -50°, is added with stirring under argon atmosphere, 2.95 ml. of a 1.67 molar etheral methyl lithium solution (4.91 mmoles MeLi).

B. After 30 minutes, the mixture of Part A is cooled to -80° and 505 mg. of methyl 2-pentynoate (4.50 mmoles) in 20 ml. of ether is added with vigorous stirring (over a period of about 2 minutes). After a further 5 minutes, 1 ml. of water is added. The reaction mixture is then allowed to attain room temperature and is filtered. The ethereal filtrates are washed with saturated sodium potassium tartrate solution and dried over sodium sulfate. After evaporation of ether, the residue is distilled at 78°–80°/50 50 mm. to afford methyl 3-methylpent-2-enoate (cis: trans ratio of 99.1:0.9).

EXAMPLE 4

A. The Grignard compound 4-methylpent-3-en-1-yl magnesium bromide is prepared in the usual manner from 300 mg. magnesium turnings (12.5 mmoles) and 2.0 g. of 4-methylpent-3-enyl bromide in 40 ml. of ether. To 5.0 g. (12.75 mmoles) and 2.0 q. of 4-methylpent-3-enyl bromide in 40 ml. of ether. To 5.0 g. (12.75 mmoles) of cuprous iodide-tri-n-butylphosphine in 50 ml. of dry ether is added, in an argon atmosphere at -78°, 1.0 g. of tri-n-butylphosphine (4.95 mmoles) and 17.0 ml. of the above Grignard solution (5.25 mmoles of Grignard compound). Immediately, a deep yellow color occurs, which turns to orange, later to green-brown, when the reactant is kept for 3.5 hours at -78°.

B. To the organo-copper reagent as prepared in Part A above is added at -100° under argon, 500 mg. (5.0 mmoles) of methyl 2-butynoate in 10 ml. of ether. After 20 minutes, 1 ml. of water is added at -100°, the coolant removed and then diatomaceous earth is added and the mixture stirred, filtered and the residue washed with ether. The combined etheral filtrates are washed with sodium chloride solution and the ether solution dried over anhydrous magnesium sulfate. After removal of ether via a 20 cm. Vigreux fractionating column, the residue is distilled uner reduced pressure to afford essentially pure trans methylgeranoate (methyl 3,7-dimethylocta-2,6-dienoate which upon reduction with, e.g. sodium borohydride, or the like, affords trans-geraniol (3,7-dimethylocta-2,6-dien -1-ol) which is useful in perfumery and as an insect bait.

EXAMPLE 5

A. To a mixture of 1.9 g. of cuprous iodide (10 mmoles) and 1.7 g. of piperidine (20 mmoles) in 100 ml. of dry ether at -80° under argon atmosphere is added with vigorous stirring a solution of 2.55 g. (10 mmoles) of trans-4,8-dimethylnona-3,7-dienylmagnesium bromide [prepared by the method of Julia et al., *Bull. Soc. Chim. France*, 1072 (1960)] in 40 ml. of ether.

B. The mixture of Part A is stirred 1 hour at -80°, there is then added a solution of 1.37 g. of pyrrolidylbut-2-ynamide (10 mmoles) in 15 ml. of ether over a period of 5 minutes. After a further 5 minutes, 1 ml. of water is injected with continued stirring at -80° and the mixture allowed to attain ice-temperature. After addition of diatomaceous earth, the mixture is filtered, washed with saturated ammonium chloride and dried over sodium sulfate. After removal of ether under reduced pressure, the residue is distilled to afford trans-pyrrolidyl-3,7,11-trimethyldodeca-2,6,10-trienamide (trans:cis ratio at $\Delta^2$ of 99.1:0.9) 9) which is a useful insect control agent and an intermediate for other insect control agents. (France Pat. No. 1,551,052).

EXAMPLE 6

A. To a suspension of 5 g. of cuprous iodide (25 mmoles) in 200 ml. of ether at 0° under argon is added 5 g. of tri-n-butylphosphine (25 mmoles) and the mixture stirred until a clear solution is obtained (about 15 minutes). After cooling to -78°, 19 ml. of 1.24 M solution of t-butyl lithium (24 mmoles) in pentane is added giving a clear yellow solution.

B. A solution of 2.7 g. of 1-cyano-1-hexyne (24 mmoles) in 20 ml. of ether/pentane (1:1) is then added at −78° to the solution of Part A with vigorous stirring over a period of 15 minutes. After a further 60 minutes, 5 ml. of water is added and the mixture allowed to attain room temperature. After filtration and washing of the organic filtrate with saturated sodium chloride solution, the solvents are removed by evaporation under reduced pressure and the liquid residue fractionally distilled at 10 mm. to afford 1-cyano-3-t-butylhex-1-ene (cis:-trans = 97.3).

EXAMPLE 7

To a solution of 4.6 g. of manganese (II) iodide (15 mmoles in 200 ml. of ether under argon at 5° is added 30 ml. of a 1.5 M solution of ethyl lithium (45 mmoles) in benzene. The resulting two-phase mixture is stirred vigorously and cooled to -80° during addition of a solution of 2.52 g. of ethyl 2-octynoate (15 mmoles) in 20 ml. of dry tetrahydrofuran. After 1.5 hours, 2 ml. of water is added and the mixture filtered. The filtrate is washed with water, saturated brine, dried over sodium sulfate and the solvents evaporated to afford an oily residue. Fractional distillation of the residue affords trans and cis ethyl 3-ethyloct-2-enoate (trans:cis ratio of 85:15).

EXAMPLE 8

The procedure of Example 4 is repeated with the exception of substituting an equivalent amount of 7,8-methylene-4,8-diemthylnon-3-enyl bromide in place of 4-methylpent-3-enyl bromide to afford cis and trans methyl 10,11-methylene-3,7,11-trimethyldodeca-2,6-dienoate which is a useful insect control agent U.S. Pat. No. 3,671,558.

The starting material 7,8-methylene-4,8-dimethylnon-3-enyl bromide can be prepared, for example, by reducing 6-methyl-hept-5-en-2-one to the corresponding C-2 alcohol uising lithium aluminum hydride, sodium borohydride, and the like, which is then converted into 5,6-methylene-6-methylhept-2-one by Simmons-Smith reaction (U.S. Pat. No. 3,074,984) followed by oxidation with manganese dioxide, chromium trioxide, or the like. Using the procedure of Julia et al., Bull. Soc. Chim. France, Nos. 1072 (1960) 5,6-methylene-6-methylhept-2-one is converted into 7,8-methylene-4,8-dimethylnon-3-enyl bromide by reaction with cyclopropyl:magnesium bromide followed by treatment with HBr.

EXAMPLE 9

A. To 5 g. of cuprous iodide in 150 ml. of ether at 0° under argon is added 5.25 g. of tri-n-butylphosphine in ether. The solution is cooled to -78° and 19 ml. of 1.24 M solution of t-butyl lithium in pentane is added and the solution stirred for 30 minutes at -78°.

B. A solution of 2 g. of methyl propiolate in 15 ml. of ether is then added, at -78°, to the solution of Part A in increments and with stirring. After addition, the mixture is stirred for 30 minutes and then 20 ml. of water is added followed by extraction with ether. the ether extracts are dried and then evaporated under reduced pressure to yield methyl 4,4-dimethylpent-2-enoate (trans:cis = 85:15).

EXAMPLE 10

A. To 5 g. of cuprous iodide in 150 ml. of ether at ice-salt temperature under argon is added 31 ml. of 1.6 M solution of n-butyl lithium in ether with stirring.

B. The reagent solution of Part A is cooled to -78° and 2.0 g. of methyl propiolate in ether is added with stirring. The mixture is stirred for 45 minutes and then 20 ml. of water is added and the mixture is added and the mixture allowed to come to room temperature. The mixture is filtered and the filtrate extracted with ether. The ether extracts are washed, dried over sodium sulfate and evaporated to yield methyl hept-2-enoate (trans:cis = 97:3).

What is claimed is:

1. A process for the stereoselective synthesis of $\alpha,\beta$-ethylenically unsaturated compounds which comprises reacting in an anhydrous organic solvent inert to the reaction, k a. an $\alpha,\beta$-acetylenically unsaturated compound of the formula $R^1-C \equiv C-Q$ wherein Q is $$-C\equiv N, \quad -\overset{O}{\overset{\|}{C}}H, \quad \left[-\overset{O}{\overset{\|}{C}}NR_2\right], \quad -\overset{O}{\overset{\|}{C}}NH_2, \quad -\overset{O}{\overset{\|}{C}}-N\begin{matrix}CH_2-CH_2\\ \\ CH_2-CH_2\end{matrix},$$

$$-\overset{O}{\overset{\|}{C}}-O\text{ alkyl}, \quad -\overset{O}{\overset{\|}{C}}-O\text{ aryl}, \quad -\overset{O}{\overset{\|}{C}}-O\text{ aralkyl},$$

$$\left[-\overset{O}{\overset{\|}{C}}-O\text{ alkyalkyl}\right], \quad -\overset{O}{\overset{\|}{C}}-\text{aralkyl}, \text{ or } -\overset{O}{\overset{\|}{C}}-\text{aryl}$$

and $R^{1\,1}$ is hydrogen, alkyl, alkenyl, alkynyl, cycloalkyl, aryl or aralkyl, each hydrocarbon group being optionally substituted with one or more chloro, fluoro, bromo, iodo, carbonyl, acyloxy, alkoxy, cycloalkoxy, cycloalkyl, alkylenedioxy, dialkyl-amino, furyl or pyridyl groups with the proviso that there are no carbonyl substituents immediately adjacent the $\beta$-carbon atom of the $\alpha,\beta$-acetylenic group; with b. an organometallic compound of the formula $RCuL$, $R_2CuLi$, or $R_3MnLi$, wherein L is a solubilizing ligand selected from tertiary phosphites, tertiary amines and secondary amines, and R is alkyl, alkenyl, alkynyl, cycloalkyl, aryl or aralkyl, each being optionally substituted by one or more alkyl, alkoxy, cycloalkyl, cycloalkoxy, alkylenedioxy, dialkylamino, pyridyl or furyl groups, with the proviso that any unsaturation present in R is spaced from the metal by two tetrahedral carbon atoms;

said reaction being carried out at a temperature of -40° to -100°C to give selectively cis addition of the group R to the β-carbon atom of the acetylenically unsaturated compound of the formula

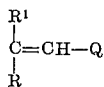

wherein R¹, R and Q are as defined above.

2. The process according to claim 1 wherein the group R¹ contains from one to twenty carbon atoms.

3. The process according to claim 2 wherein each of the groups R¹ and R contains from one to twelve carbon atoms.

4. The process according to claim 1 wherein the organometallic compound is RCuL or R₂CuLi.

5. The process according to claim 4 wherein the organometallic compound is R₂CuLi, prepared by reacting a copper salt with an organo-lithium compound, in an anhydrous organic solvent inert to the reaction, at a temperature of from about -150°C to about room temperature and optionally in the presence of a solubilizing ligand selected from tertiary phosphines, tertiary phosphites, secondary amines and tertiary amines.

6. The process according to claim 4 wherein the organometallic compound is prepared by reacting a copper salt with an organo-magnesium halide, in an anhydrous organic solvent inert to the reaction, at a temperature of from about -150°C to about room temperature and optionally in the presence of a solubilizing ligand selected from tertiary phosphines, tertiary phosphites, secondary amines and tertiary amines.

7. The process according to claim 4 wherein the organometallic compound is prepared by reacting a copper salt with a diorganomagnesium compound, in an anhydrous organic solvent inert to the reaction, at a temperature of from about -150°C to about room temperature and optionally in the presence of a solubilizing ligand selected from tertiary phosphines, tertiary phosphites, secondary amines and tertiary amines.

8. The process according to claim 1 wherein Q is

alkyl, said alkyl group containing one to six carbon atoms and R¹ is alkyl of one to six carbon atoms.

9. The process according to claim 5 wherein R is methyl, R¹ is ethyl, and Q is

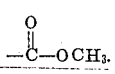

10. The process according to claim 5 wherein R is methyl, R¹ is n-propyl, the solubilizing ligand is pyrrolidine and Q is

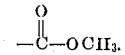

11. The process according to claim 6 wherein the organomagnesium compound is 4-methyl-pent-3-enyl magnesium bromide, the solubilizing ligand is tri-n-butylphosphine, Q is

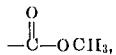

and R¹ is methyl.

12. The process according to claim 6 wherein the organomagnesium compound is trans-4,8-dimethylnona-3,7-dienyl magnesium bromide, the solubilizing ligand is piperidine, R¹ is methyl, and Q is

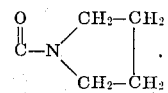

13. The process according to claim 5 wherein R is t-butyl, the solubilizing ligand is tri-n-butylphosphine, Q is —C≡N, and R¹ is n-butyl.

14. The process according to claim 6 wherein the organo-magnesium compound is 7,8-methylene-4,8-dimethylnon-3-enyl magnesium bromide, the solubilizing ligand is tri-n-butylphosphine, Q is

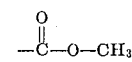

and R¹ is methyl.

15. The process according to claim 5 wherein R is t-butyl, the solubilizing ligand is tri-n-butylphosphine, R¹ is hydrogen and Q is

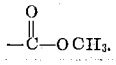

16. The process according to claim 5 wherein R is n-butyl, R¹ is hydrogen and Q is

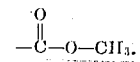

17. The process according to claim 5 wherein Q is

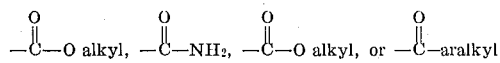

and the solubilizing ligand is a secondary or tertiary amine.

18. The process according to claim 4 wherein R is alkyl, alkenyl, or alkynyl, each group containing from four to twelve carbon atoms.

* * * * *